FIP8212 UR 3,334,236

250/201

Aug. 1, 1967 J. R. BACON 3,334,236

PHOTO-OPTICAL LIGHT PEN AND AMPLIFIER

Filed Nov. 23, 1964 2 Sheets-Sheet 1

INVENTOR.
JAMES R. BACON

BY Carl Fissell Jr.
AGENT

PHOTO-OPTICAL LIGHT PEN AND AMPLIFIER

Filed Nov. 23, 1964 2 Sheets-Sheet 2

United States Patent Office 3,334,236
Patented Aug. 1, 1967

3,334,236

PHOTO-OPTICAL LIGHT PEN AND AMPLIFIER

James R. Bacon, Philadelphia, Pa., assignor to Burroughs Corporation, Detroit, Mich., a corporation of Michigan Filed Nov. 23, 1964, Ser. No. 413,270
14 Claims. (Cl. 250—217)

This invention relates to light responsive control apparatus and, more particularly, although not necessarily exclusively, to photo-electrically activated control apparatus for sensing and/or reading light signals and converting the same into electrical potentials for application to other associated apparatus. With still more specificity, the invention relates to a so-called light pen and to means for automatically actuating the internal mechanism associated with the light pen when the latter is brought into contact with the implosion shield surrounding a cathode ray tube on which information to be sensed thereby is displayed. More particularly, the invention has to do with novel means for biasing the photo-responsive element of the light pen from a standby condition into a more favorable high level electrically conducting condition enabling the amplifier associated therewith to respond to information displayed on the cathode ray tube while ignoring the ambient light normally associated with such display apparatus. The invention further includes a novel preamplifier for use with the light pen permitting the sensing element of the pen to differentiate between the ambient and the transient data light sensed thereby thus to insure accurate and positive pick-up of displayed information.

It is an important object therefore of the invention to provide a new and novel light pen structure for solving the foregoing problems.

Another object of the invention is to provide a light pen in which the electro-mechanical and optical elements are coaxially disposed therein together with an electronic preamplifier.

Another object of the invention is to provide means within the light pen structure for biasing the sensing element thereof from a standby condition into a high level conducting condition.

It is also an object of the invention to provide a light pen having means for reflecting a portion of the aiming and activating light onto the sensing means while permitting the balance of the light to project onto the target area.

In accordance with the foregoing objects and first briefly described, the present invention comprises electro-photo-optical apparatus in the form of an elongated pen-like structure having means therein for generating a pattern of light effective to delineate a target area on the face of a cathode ray tube on which target information is displayed. Means is provided within the light pen structure for reflecting a portion of the target delineating light back onto the photo-sensing means so as to bias the sensing mechanism from a standby condition into a more favorable high level electrically conducting condition. Further means is provided for translating the light signal which is picked up from the target area and projected onto the optical sensing device into an electrical signal output effectively discriminating between the ambient light and the target light for transmitting the target light to associated utilization apparatus such for example, as an electronic computer. All of the optical, mechanical and electrical components of the apparatus are disposed axially of the light pen housing thereby to provide optimum sensitivity, efficiency of operation and ease of handling.

These and other objects and advantages of the invention will become more apparent and will be explained further in detail when taken in conjunction with the appended specification and claims and the accompanying drawings in which:

Figure 1:
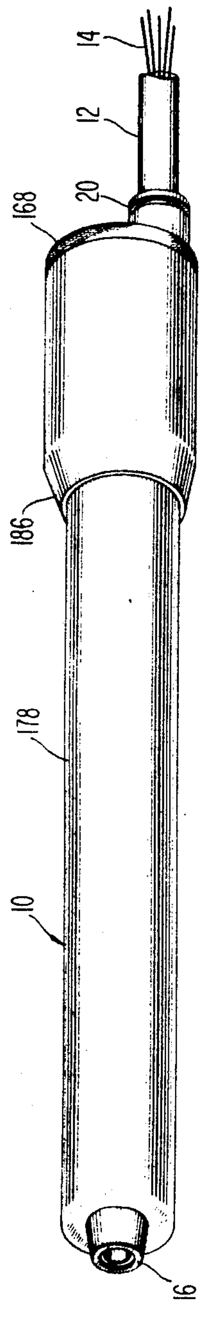
FIGURE 1 is an isometric view of a preferred embodiment of the present invention.
Figure 2:
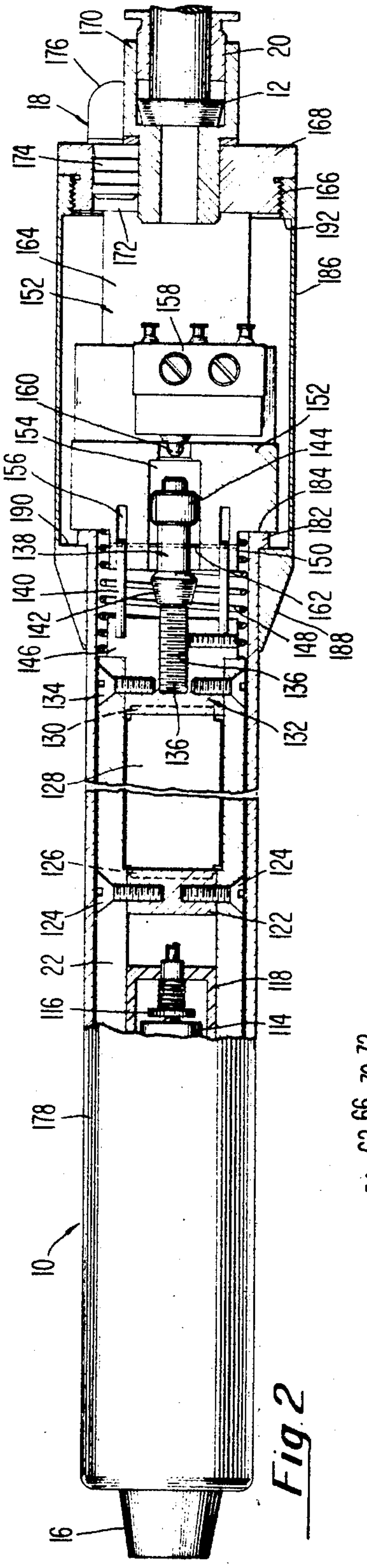
FIGURE 2 is a partial sectional view drawn to an exaggerated scale of the apparatus of FIGURE 1.
Figure 3:
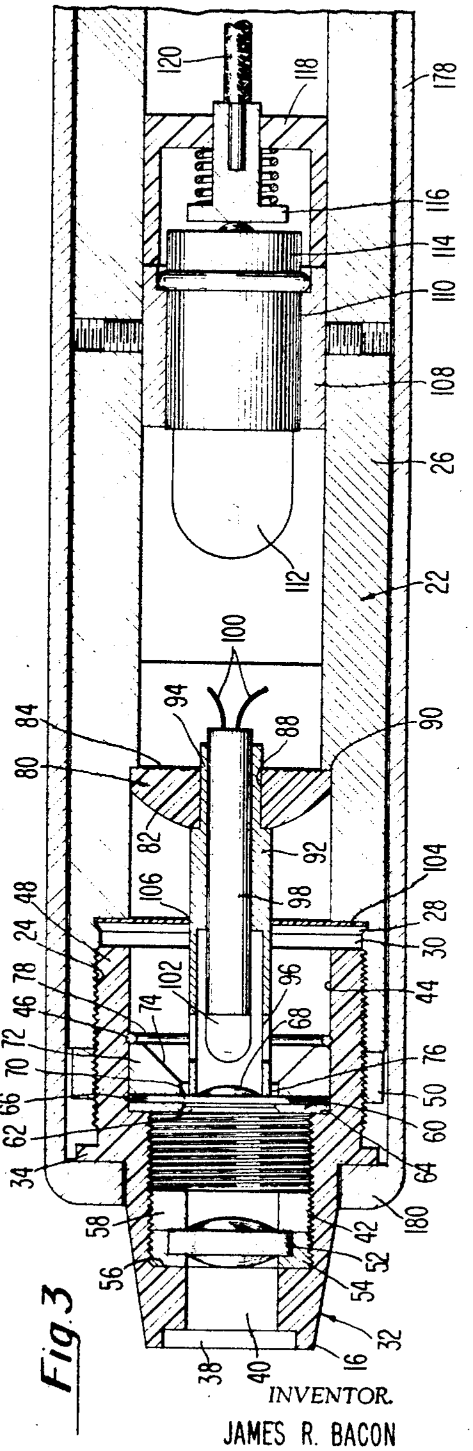
FIGURE 3 is a greatly enlarged sectional view of the electro-optical portion of the device of FIGURE 1.
Figure 4:
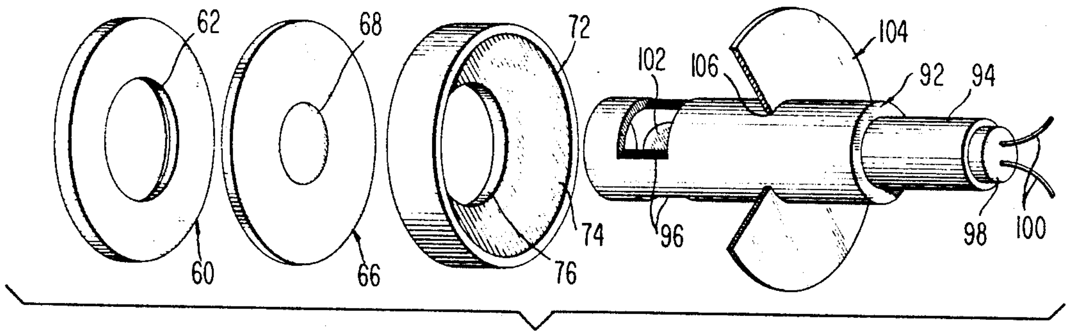
FIGURE 4 is an exploded isometric view of the optical transducing portion of the device of FIGURE 3.

Apparatus embodying the present invention is seen by reference to FIGURES 1, 2 and 3 generally, to comprise a tubular, elongated, pen-like structure or assembly 10, one end of which is provided with a connecting cable 12, including electrically conductive leads 14. The terminal end of the cable (not shown) is adapted to be pluggably received within a suitable receptacle in a console of associated electrical apparatus including one or more cathode ray tubes with which the present invention is operably associated, as described hereinafter. The opposite end of the assembly 10 includes a short truncated cone-like projecting barrel 16 which, as will be hereinafter described in detail, provides means for actuating the apparatus and illuminating a small incandescent bulb 18, demountably secured to the opposite end of the device adjacent to the cable connector 20, when a so-called "legal" target is sensed or picked-up by the apparatus.

Referring to FIGURE 3, which is a greatly enlarged longitudinal sectional view of the apparatus embodying the present invention, there is shown an elongated barrel 22, the leftward end of which is provided with an enlarged internally threaded circular opening 24, therethrough, and a pair of rightwardly extending spaced, parellel, elongated, arm-like members 26—26 the purpose of which will be explained later on herein. The enlarged opening 24 is internally threaded and is provided with an undercut circular recess or ledge 28, concentric with the opening 24, and an intermediate flange 30, for purposes to be described presently.

A cylindrically shaped lens holder 32 is seen to include an enlarged circular external flange 34, intermediate its opposite open ends, for purposes to be explained presently. The leftward portion of member 32 is tapered slightly as previously indicated at 16. An enlarged bore 38 at the left end of member 32 opens into a central bore 40 of slightly smaller diameter adjacent thereto which in turn opens into a relatively larger internally threaded bore 42. Adjacent to bore 42 is still another larger smooth bore 44, having a shallow circular groove 46 intermediate its ends, for purposes still to be described. The outer periphery of the rightward portion of lens holder 32 is threaded as at 48 and is adapted to receive a threaded knurled nut 50, thereon for purposes to be described hereinafter.

An objective lens 52 having equiconvex, sphericular, opposite surfaces is carried by a lens retaining ring 54 and is disposed within lens holder 32 so as to seat against the ledge 56 after which a lens jam nut 58 is threaded into the threaded aperture 42 thereby to retain the lens in the position shown in FIGURE 3, adjacent the forward opening 38 in lens holder 32. A circular lens mask 60 having a central opening 62 therethrough, one side of which is chamfered outwardly, as shown, is disposed against the ledge 64. A field target lens 66 having a central convex lens portion 68 and a peripheral clear portion 70 is disposed against the mask 60 with the convex surface facing rightwardly as in FIGURE 3. A circular reflector member 72 having a circularly disposed reflecting, highly polished surface portion 72 thereon, angled at approximately 45° from the center, is arranged such that the circular open portion or aperture 76 thereof is adjacent to and surrounds the convex portion of the field target lens 66 with the reflecting surface facing rightwardly as seen in FIGURE 3. A retaining ring 78 is press-fitted into the retaining ring groove 46 so as to secure each of the previously described elements including the reflector in its respective position or location within the lens holder 32.

A finder field lens 80, having a convex surface portion 82 and a substantially flat lenticular portion 84 thereon, has a central aperture 88 disposed therethrough. Lens 80 is arranged within the barrel 22 adjacent the ledge or ridge 90 with the convex portion thereof oriented leftwardly as in FIGURE 3. An opaque cell holder 92 has an undercut portion 94 received within the aperture 88 in finder field lens 80. Cell holder 92 is provided with an internal smooth bore and a pair of oppositely disposed elongated slots 96 slightly displaced from the leftward end thereof, FIGURE 3, and opening completely through the holder. A photo-transistor 98, having a pair of conducting leads 100—100 extending rightwardly away therefrom is disposed within the cell holder in press-fit relationship therewith, with the active end portion 102 thereof disposed adjacent the slotted openings in the cell holder and in close proximity to the convex surface 68 of the field target lens 66. The forward end portion of the photo-transistor has had the opaque covering thereon stripped away from a portion thereof so as to make the active internal area thereof accessible to light, in a manner hereinafter described.

So as to align and support the photo-transistor and cell holder axially of the lens system heretofore described, there is provided a supporting collar 104 of ester base, clear, plastic film having a central through aperture 106 for receiving and orienting the cell holder 92, as seen most clearly in FIGURE 3. The member 104 is adapted to be press-fitted into the groove 28 provided therefor in the leftward end portion of the barrel 22.

A lamp retainer 108, provided with central aperture 110 therethrough and oppositely disposed orienting slots (not shown) permit the retainer to be received between the parallel legs 26—26 of the barrel 22. An incandescent lamp 112 is mounted within a lamp holder 114 retained between members 26—26 as by screws so as to make physical and electrical contact with a contact 116 in receptacle 118 forming one side of an electrical circuit for illuminating the bulb. The other side of the circuit is formed by the barrel of the light pen, see FIGURE 6. The leads 120 are brought out approximately at the rear of the pen to the cable 12 in a conventional manner.

Adjacent to the lamp retainer is a printed wiring circuit board locator 122, FIGURE 2, secured between legs 26—26 by means of a pair of oppositely disposed recessed mounting screws 124. A substantially rectangular recess or groove 126 in member 122 is adapted to receive one end of a printed wiring panel or circuit board 128 attached thereto by means of small screws (not shown). Circuit board 128, which will be described in conjunction with FIGURE 6 later on herein, incorporates a novel electronic preamplifier for use with the photo-transistor and reflector system of the present invention.

The opposite end of the circuit board 128 is supported by means of a slot 130 disposed in a switch actuator mounting block 132 secured between the arms 26—26 by means of screws 134 and forming a closure for the rightward end of barrel 22. A central aperture 136 in member 132 is threaded to adjustably receive a threaded switch actuating detent plunger 138, for purposes to be described shortly. Oppositely disposed, parallel pins 140 are press-fitted into respective apertures in block 132 and extend away therefrom a short distance. Detent plunger 138 includes an enlarged central protuberance 142 and a circular enlarged guide member 144 integral therewith. The mounting block is provided with one or more oppositely disposed openings through which the interconnecting electrical leads for the lamp 112 and photo-transistor 98 may be received and passed back to the cable of the pen.

The rim portion 146, extending rearwardly from the switch mounting block 132, is adapted to receive one end of a compression spring 148 in surrounding engagement therewith, FIGURE 2. The opposite end of spring 148 is receivable over the undercut portion 150, of an irregularly shaped switch mounting end cap member 152 which is provided with a central opening 154 extending therethrough and a pair of oppositely disposed, parallel apertures 156 also extending therethrough into which the forward portions of the pins 140 of the mounting block 132 are slidably, reciprocably receivable. A momentary contact switch 158, disposed on a ledge of the switch mounting end cap with its actuator 160 extending into the central opening 154, is coaxially aligned with the rearward end portion of the switch actuator plunger 138, for purposes which will appear more clearly hereinafter. A flexible pin 162, disposed transversely of the plunger 138, provides means for making the switch actuation audible to the operation when plunger 138 moves axially of the opening 154, as hereinafter described.

The rearward flat ledge portion 164 provides a relief area for the termination of the lead wires which are fed back from the photo-transistor, the light bulb and the preamplifier subassembly incorporated on the printed circuit mounting panel 128. The rearward rim of the switch mounting end cap 152 is provided with an undercut threaded portion 166 terminating in a knurled handling rim 168 permitting the entire structure to be rotated by hand. This rearward portion is also provided with an enlarged opening to receive a conductive cap 170 by means of which cable 12 for leads 14 is attached and fed backwardly to a plug, not shown, for attachment to the electronic console, earlier mentioned, with which the device is to be operated. A smaller secondary aperture 172 in the end cap is provided with a press-fit plastic receptacle 174 into which are received two hollow conductive members, not shown, which are electrically interconnected to the cable and fed outwardly therefrom, for purposes now to be described.

The incandescent bulb 18, of extreme miniature variety, having elongated lead wires (not shown) is adapted to be received within the plastic receptacle 174 in press-fit relationship therewith so that its lead wires can extend into the aforementioned hollow conductors so as to make electrical contact therewith. A transparent plastic end cap 176 is snap-fitted over the plastic receptacle to provide shock mounting and dust protection for the miniature light bulb.

An elongated hollow tubular pen jacket 178 having an inwardly turned rim 180 at one end thereof and an outwardly turned rim 182 at its opposite end is adapted to be received over the barrel 22 so that the internal rim is in abutting surface contact with the ledge 34 on the lens holder 32 and so that the external rim 182 is received against the ledge 184 on the switch actuator mounting block 152.

A housing retainer 186, having a conically shaped end portion 188 and an internal circular ridge 190 at one end thereof and a ridge 192 at the opposite end thereof is receivable over the pen jacket 178 so that the internal ledge rests against the external rim of the jacket and whereby the internally threaded portion is engageable with the threads 166 of the switch mounting end cap. Thus the apparatus can be assembled into a single unitary assembly by rotating the housing retainer relative to the knurled portion of the end cap. Disassembly is equally simple.

A difficult problem associated with electronic transducing devices such as the foregoing, is that of the sensitivity of the device and the relative speed with which the associated electronic apparatus is adapted to operate. The light pen obviously must be compatible both in sensitivity and speed of operation with the electronic console with which it is to be used. The console of the apparatus with which the present light pen is incorporated is adapted to display a new "piece of data" on the cathode ray tube therein approximately every five microseconds. The sensitivity required of the device is that it be capable of responding, reliably, to very short vectors at a line brightness of approximately five foot lamberts. The pen device is adapted to be actuated by pressure of the forward or nose end 16 thereof against the implosion shield of the cathode ray tube thereby causing the pen barrel to move relative to the jacket compressing the spring 148 and closing switch 158 enabling or activating the apparatus. It is also desirable that the device be self-contained to the extent that the operator thereof is not required to remove his attention from the CRT display in order to determine whether or not he has made a "valid hook." A hook is a slang expression defined herein as the detection of a so-called "legal" vector or symbol on the cathode ray tube. The present apparatus is capable of adequately performing under the foregoing specific and other less restrictive operational requirements. The present data change is at the rate of every five microseconds and thus there is a need for preventing two pieces of data from interfering in time. The present apparatus has an extremely fast rise time and a relatively short decay time. Since it is possible that the present apparatus may be required to interrogate the end of a vector, and since there is a possibility that the end of one vector may cross the origination or starting point of a second vector, there is a requirement that the two bits of information relative to the vectors be not confused with one another as they are written on the screen. A recovery time in the present apparatus of 2½ microseconds is considered a maximum allowable recovery time.

Photo-transistor 98 used with the present apparatus can be made to operate with a relatively high speed of response and high sensitivity by operating the cell with a "light bias" imposed upon it. This light bias is provided by means of a DC light source, in this case the light bulb 112, which effectively causes the photo-transistor to operate at a higher point on its characteristic curve than heretofore was possible. Effectively light from the bulb is reflected by member 72 onto the photo-transistor biasing the photo-transistor into its conductivity region. This produces a greater gain for the device, and a higher bandwidth than would be the case if the device were operated at very low operating currents.

Figure 5:
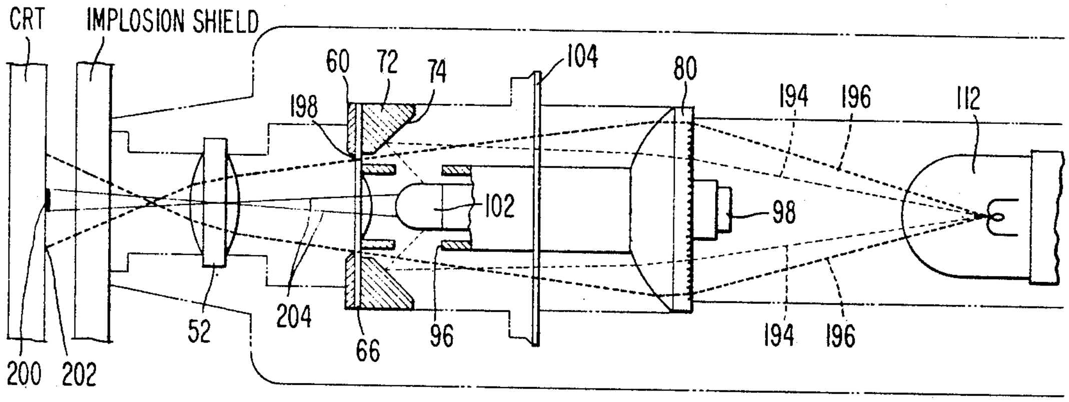
FIGURE 5 is an idealized ray trace diagram for the apparatus of FIGURE 3.

As seen in FIGURE 5, which is an idealized ray trace diagram for purposes of explanation only, the arrangement of the reflector 72 relative to member 98 is such that a portion of the light from the light bulb 112 rays 194 is reflected onto the active portion 102 of the photo-transistor 98 via member 72. The remainder of the light rays 196 pass through a circular opening 198 defined by the internal periphery of the aperture in the reflector 72, the external rim of the forward (leftward in FIGURE 3) end of the cell holder 98 and the internal peripheral rim of opening 62 in lens mask 60 to form a circle of light 202 on the CRT screen. As shown, the light circle 202 surrounds a "target or blip" 200. Light rays 204 from the "blip" are directed onto the photo-transistor 98 effective to energize the same and produce a useful electrical output as will now be described.

As hereinbefore mentioned, it is necessary that the circuitry employed with the apparatus be able to differentiate between the DC level current from the light bias as a result of light being reflected from the bulb to the photo-transistor and the "step" of current which occurs when the photo-transistor senses a blip or target 200 on the CRT on which data is being written or displayed. The problem of differentiating between DC light and the transient light is somewhat more difficult when the CRT phosphor which is employed has a very long persistence characteristic as compared to the 5 microsecond cycle time of the apparatus with which the device is employed. For this reason, an accurate differentiating amplifier capable of passing a pulse corresponding only to the leading edge of the light intensity or burst of light which occurs when a piece of information, i.e., bit or blip, is written on the screen is required. The present preamplifier circuit now to be described solves the foregoing problems in a novel manner.

Figure 6:
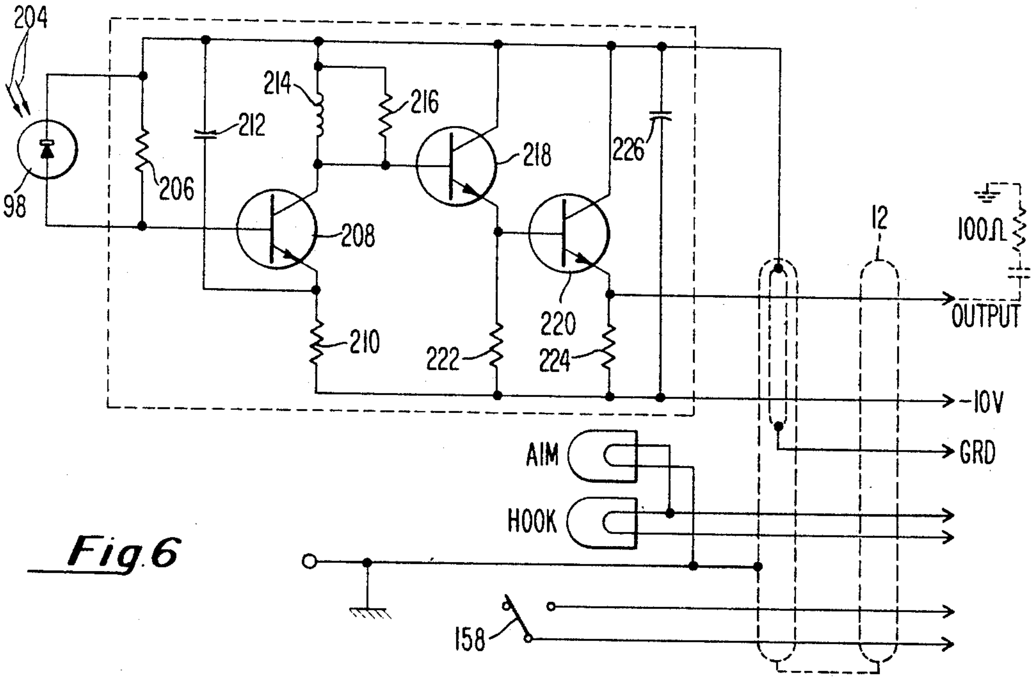
FIGURE 6 is an electrical schematic diagram of the novel preamplifier apparatus of the invention.

Referring to the schematic diagram, FIGURE 6, wherein the light pen preamplifier is illustrated, photo-transistor 98 is shown with arrows 204 oriented at an angle to demonstrate that light is being directed thereto via the reflector 72 from the light bulb 112. The circuit diagram is illustrated as if it were conventional electrical wiring. It is understood however that the printed wiring assembly 128 is actually utilized in place thereof. Photo-transistor 98 is connected across, i.e., in parallel, with a resistor 206. Transistor 208 has its base connected to one side of photo-transistor 98. The emitter of transistor 208 is connected to ground via resistor 210 and is at approximately AC ground being decoupled by means of a .1 microfarad capacitor 212 connected between the emitter of the transistor and signal ground. The collector of transistor 208 is connected through an inductor 214 to signal ground. The emitter of 208 is at approximately −10 volts, DC; the current which flows in 208 is the current from the photo-transistor multiplied by the beta of this transistor. Since this current, when no signal is being applied from the CRT, is a DC current, the inductor 214 has little or no voltage drop across it except for the voltage drop which is across the DC resistance of the inductor. Therefore 208 has approximately 10 volts between its collector and emitter during this period of time.

Since the emitter of 208 is at AC ground at all times, the base of 208 will follow the emitter by approximately a difference of 7/10 of a volt DC. The voltage which is across the photo-transistor 98 is very close to being 9.3 volts at all times. The voltage across 98 is thus practically independent of the amount of current which is flowing therein or in the transistor 208. This situation has a distinct advantage in obtaining the maximum speed available from the photo-transistor since the shunt capacity thereof does not have to be charged to any extent during the pulse time.

When a step of light is applied to the photo-transistor this causes a step of current to flow in the base of transistor 208. This step of current is then multiplied by the beta of the transistor and flows into the collector load consisting of inductor 214, resistor 216 in parallel therewith and the input impedance of transistor 218, the base of which is connected to the collector of transistor 208 and the collector of which is at ground. Thus inductor 214 and its shunted capacity plus the capacity effect of transistor 208 and also the resistor 216 forms a damped, parallel, resonant circuit. The voltage appearing at the collector of 208 is a half-sinusoidal pulse having a period depending upon the resonant frequency of inductor 124 and the shunted capacity across this inductor. This tank circuit is approximately damped at twice critical damping. It has been determined that this amount of damping reduces the ringing of the tank circuit to an acceptable level. The use of critical damping would both lower the resonant frequency of the damped tank in the collector of 208 and also reduced the voltage gain.

Transistors 218 and 220 are emitter followers having resistors 222 and 224 in the emitter leg of each thereby avoiding a high impedance input such that there is little additional loading across the tank circuit. The output of 220 connects through the light pen cable into the console at which point it drives a capacitively coupled 100 ohm load to ground. Capacitor 226 forms a decoupling capacitor to ground for the power supply.

The two lights labeled "hook" and "aim" are the lamps 18 and 112 respectively, incorporated in the light pen, as previously described. The "hook" lamp at the back of the pen indicates to the operator that he has made a legal hook on the data on the face of the CRT. The "aim" lamp provides light bias to the diode and also provides a ring of light for aiming which is projected onto the face of the CRT encircling the target to which the light pen is directed. Switch 158 is actuated, as earlier described herein, by pressing the forward end 16 of the light pen against the implosion shield of the CRT. When this switch is closed the logic in the console with which the pen is associated is enabled so as to accept the light pen output pulses.

The present invention is related to and constitutes an improvement over the invention described and claimed in copending United States patent application Ser. No. 229,831, to James A. Ogle and James E. Jones, for "Photo-optical Light Responsive Control Apparatus," now Patent 3,247,391 and assigned to the same assignee as the present invention.

What is claimed is:

1. Photo-optical light responsive control apparatus comprising:

(a) a first optical system,
(b) a second optical system arranged axially of said first system,
(c) said first optical system including a source of light and lens means for focusing light upon a discrete area at a predetermined distance from said second optical system,
(d) said second optical system including a light responsive member and lens means effective to focus direct light from an object area adjacent to but displaced said predetermined distance from said second optical system, and
(e) means comprising a portion of the light from said source for biasing said light responsive member from a standby condition into a highly conducting condition effective to increase the gain of said last named member.

2. Photo-optical light responsive control apparatus comprising:

(a) a housing,
(b) a first optical system disposed in said housing,
(c) a second optical system disposed in said housing,
(d) said first optical system including a source of light and lens means for focusing said light upon a discrete area at a predetermined distance from one end of said housing,
(e) said second optical system including a light responsive member and lens means effective to focus direct light from an object area adjacent to but separate from said discrete area, said object area being displaced said predetermined distance from one end of said housing, and
(f) means for reflecting a portion of said light from said first optical system to said light responsive member effective to light bias said light responsive member into a conducting condition at a higher point on its characteristic curve thereby to increase the gain of said member.

3. Photo-optical light responsive control apparatus comprising:

(a) a housing, (b) a first optical system disposed in said housing,
(c) a second optical system disposed in said housing,
(d) said first optical system including a source of light and lens means for focusing said light upon a discrete area at a predetermined distance from one end of said housing,
(e) said second optical system including a light responsive member and lens means effective to bring direct light into focus from an object area adjacent to but separate from said discrete area, said object area being displaced said predetermined distance from one end of said housing, and
(f) optical means adjacent to said first optical system for biasing said light responsive member into the most favorable position of its characteristic conduction curve.

4. The invention in accordance with claim 3 wherein said optical means is a concentric mirror.

5. Photo-optical transducer apparatus comprising:

(a) a source of illumination,
(b) light collecting means in the path of light from said source for collecting light therefrom,
(c) an optical objective disposed in said light path effective to project light from said source onto a target area adjacent said objective,
(d) a target field optical member intermediate said objective and said light collecting means and means operably associated with said target field member forming an aperture through which light from said source is obliged to pass to said target area.
(e) means coaxially arranged relative to said light collecting means and said target field member responsive to direct light from the target area for generating an electrical signal output, and
(f) concentric means disposed adjacent to said first and second lens system for reflecting a portion of said light from said source of illumination to said signal generating means and effective to bias said signal generating means into a highly conducting condition.

6. Photo-optical transducer apparatus comprising:

(a) a source of illumination,
(b) a finder field lens in the path of the light from said source for collecting light therefrom,
(c) an objective lens in said light path for projecting light from said source onto a target area adjacent said objective lens,
(d) a target field lens intermediate said objective lens and said finder field lens and means operably associated with said target field lens forming an aperture through which light from said source is obliged to pass to said target area,
(e) light responsive signal generating means coaxially arranged relative to said finder field and said target lenses for receiving direct light from the target area adjacent said objective lens, and
(f) a circular apertured reflecting member coaxially arranged with respect to said objective and target field lenses for reflecting light from said source of illumination back onto said light responsive signal generating means to bias the same from a standby condition into a highly conducting condition.

7. Photo-optical transducer apparatus comprising:

(a) a source of illumination,
(b) a finder field lens in the path of the light from said source for collecting light therefrom,
(c) an objective lens in said light path for projecting light from said source onto a target area adjacent said objective lens,
(d) a target field lens intermediate said objective lens and said finder field lens and means operably associated with said target field lens forming an aperture through which light from said source is obliged to pass to said target area,
(e) light responsive signal generating means coaxially arranged relative to said condenser and said target lenses for receiving direct light from the target area adjacent to said objective lens,
(f) means coaxially arranged with respect to said lenses and including an aperture therein for reflecting light from said source of illumination back onto said light responsive signal generating means to bias the same from a standby condition into a highly conducting condition, and
(g) means operably associated with said light responsive means permitting a portion of the light from said source to pass to said light responsive means while effectively blocking the remainder of the light from said source from said light responsive member.

8. The invention in accordance with claim 7 wherein said last named means is a tubular light shield having a pair of oppositely disposed apertures in the end portion thereof surrounding the active end of said light responsive member for receiving the reflected light therethrough.

9. Photo-optical transducer apparatus comprising:
(a) a source of illumination,
(b) light collecting means in the path of light from said source for collecting light therefrom,
(c) an optical objective disposed in said light path effective to project light from said source onto a target area adjacent said objective,
(d) a target field optical member intermediate said objective and said light collecting means and means operably associated with said target field member forming an aperture through which light from said source is obliged to pass to said target area,
(e) means for reflecting the portion of said light from said source of illumination to said light collecting means,
(f) means coaxially arranged relative to said light collecting means and said target field member responsive to direct light from the target area for generating an electrical signal output, and
(g) a solid state differential amplifier means operably associated with said light responsive member for amplifying the output signal therefrom for application to other utilization apparatus.

10. Photo-optical transducer apparatus comprising:
(a) a source of illumination,
(b) light collecting means in the path of light from said source for collecting light therefrom, said light collecting means including means integral therewith for diffusing said light,
(c) an optical objective disposed in said light path effective to project light from said source onto a target area adjacent said objective,
(d) a target field optical member intermediate said objective and said light collecting means and means operably associated with said target field member forming an aperture through which light from said source is obliged to pass to said target area,
(e) concentric reflective means intermediate said light collecting means and said target field member for reflecting a portion of said light from said source of illumination to said light collecting means,
(f) means coaxially arranged relative to said light collecting means and said target field member responsive to direct light from the target area for generating an electrical signal output, and
(g) means mounting said target field member and said optical objective for movement relative to said light collecting means effective to focus the light from said source onto an object in the path of said light.

11. Photo-optical transducer apparatus comprising:
(a) a housing including means indicating a desired condition of operation of said apparatus,
(b) a source of illumination,
(c) a finder field lens in the path of the light from said source for collecting light therefrom,
(d) an objective lens in said light path for projecting light from said source onto a target area adjacent said objective lens,
(e) a target field lens intermediate said objective lens and said condenser lens and means operably associated with said target field lens forming an aperture through which light from said source is obliged to pass to said target area,
(f) light responsive signal generating means coaxially arranged relative to said condenser and said target lenses for receiving direct light from the target area adjacent said objective lens,
(g) an apertured member coaxially arranged with respect to said objective and target field lenses for reflecting light from said source of illumination back onto said light responsive signal generating means to bias the same into a highly conducting condition, and
(h) means mounting said lenses and said source of illumination for movement relative to said housing effective when moved to activate said indicating means apprising the user of said apparatus of said desired condition.

12. The invention in accordance with claim 11 wherein said mounting means further includes means operably associated with said housing and operable as an audible indicating means for producing an audible indication of the status of said apparatus.

13. Photo-optical transducer apparatus comprising:
(a) a housing including audible means indicating a desired condition of operation of said apparatus,
(b) a member movable with respect to said housing and said audible means, said housing being compactly engageable with the face plate of an operably associated display device effective upon such engagement to actuate said audible indicating means,
(c) a source of illumination,
(d) a finder field lens in the path of the light from said source for collecting light therefrom,
(e) an objective lens in said light path for projecting light from said source onto a target area adjacent said objective lens,
(f) a target field lens intermediate said objective lens and said condenser lens including means forming an aperture through which light from said source is obliged to pass to said target area,
(g) light responsive signal generating means coaxially arranged relative to said finder field and said target lenses for receiving direct light from the target area adjacent said objective lens,
(h) an apertured member coaxially arranged with respect to said objective and target field lenses for reflecting light from said source of illumination back onto said light responsive signal generating means to bias the same into a highly conducting condition, and
(i) means mounting said movable member for movement relative to said housing effective when moved to produce an audible sound apprising the user of said apparatus of said desired condition.

14. Photo-optical transducer apparatus comprising:
(a) a housing having an open end thereof contactually engageable with the face plate of a display device and adapted upon such engagement to surround a target area on the face plate so as to obscure the target area from view by the operator,
(b) light projecting means interior of the housing including a source of illumination and lenses arranged in axial relation to one another for projecting a light beam through the open end of the housing onto an adjacent target area,
(c) light responsive signal generating means interior of the housing arranged to receive light from the target area along the axis of the light projecting means, (d) operator indicating means, (e) a member carried by the housing and normally projecting beyond the open end thereof, said member being mounted for movement relative to the housing and adapted to engage and be moved by the face plate of a display device when the open end of the housing is brought up thereagainst, and (f) means operatively associated with said light responsive signal generating means and with said operator indicating means and responsive to the movement of said member to cause the indicating means to indicate to the operator that even though the housing obscures his view of the target area the light projecting and light responsive means of the apparatus are axially aligned with a target in the target area.

References Cited

UNITED STATES PATENTS

| | | | |
|---|---|---|---|
| 2,816,705 | 12/1957 | Thrall et al. | 250—202 |
| 2,838,683 | 6/1958 | Munro | 250—227 |
| 2,915,643 | 12/1958 | Mork | 250—217 |
| 3,130,317 | 4/1964 | Connelly et al. | 250—227 |
| 3,183,353 | 5/1965 | Baldwin | 250—207 X |
| 3,247,391 | 4/1966 | Ogle et al. | 250—216 |

WALTER STOLWEIN, *Primary Examiner.*